INVENTOR.
DAVID L. PAINE
BY
Roger W. Jensen
ATTORNEY

Sept. 5, 1967  D. L. PAINE  3,339,420
CONTROL APPARATUS

Filed May 1, 1963  3 Sheets-Sheet 2

INVENTOR.
DAVID L. PAINE
BY
Roger W. Jensen
ATTORNEY

Sept. 5, 1967  D. L. PAINE  3,339,420
CONTROL APPARATUS
Filed May 1, 1963  3 Sheets-Sheet 3
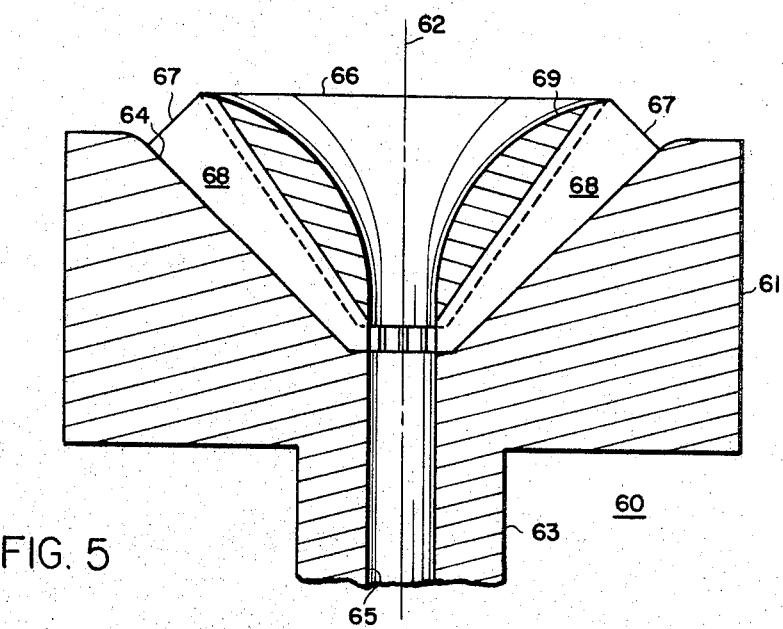
FIG. 5
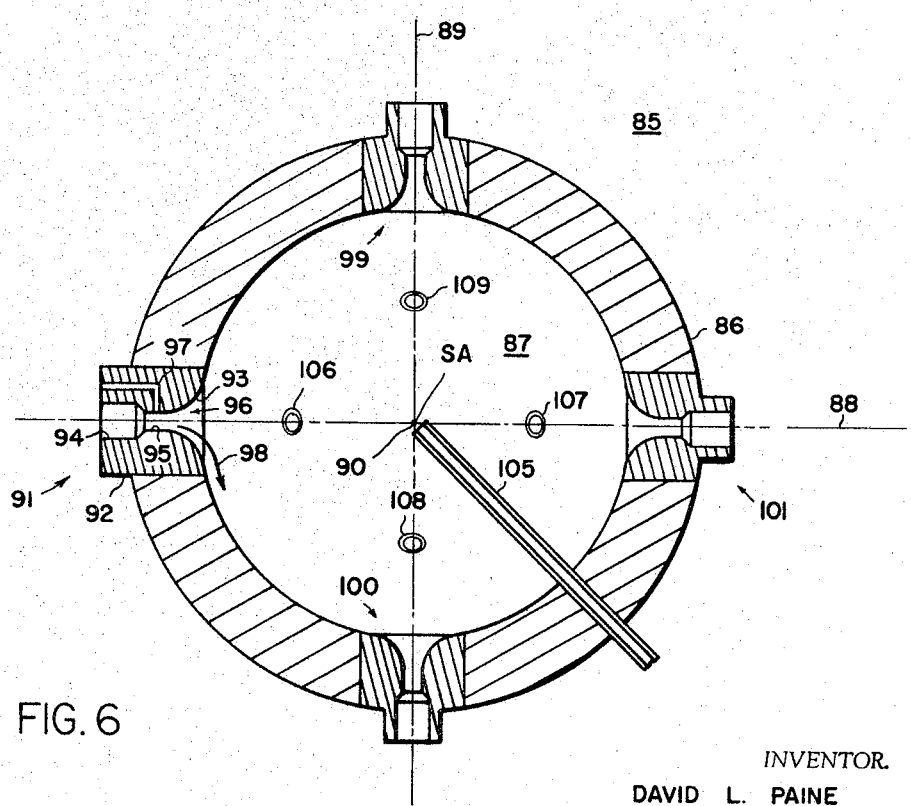
FIG. 6
INVENTOR.
DAVID L. PAINE
ATTORNEY

# United States Patent Office 3,339,420
Patented Sept. 5, 1967

3,339,420
CONTROL APPARATUS
David L. Paine, Minneapolis, Minn., assignor to Honeywell Inc., a corporation of Delaware
Filed May 1, 1963, Ser. No. 277,173
15 Claims. (Cl. 74—5)

This invention is related to sensitive instruments and more particularly to pure fluid sensitive instruments.

The applicant's invention has special application as a pure fluid position sensor and will be described with reference thereto; however the applicant's invention is not limited to this application. The applicant's invention utilized as a pure fluid position sensor includes a housing means fixed with respect to a reference coordinate system and having a spherical chamber therein. A flow of fluid is provided to the chamber through an inlet nozzle. The inlet nozzle is effective to cause the fluid within the chamber to rotate about a spin axis. The inlet nozzle is also effective to maintain the alignment of the spin axis of the fluid substantially fixed in space when the reference coordinate system (housing) is displaced relative thereto. Means are provided for sensing the position of the reference coordinate system (housing) relative to the spin axis so as to give positional information.

It is important to differentiate a position sensor (displacement gyro) which senses angular displacement about an axis, from a rate sensor (rate gyro) which senses angular velocity about an axis. There are prior art designs of rate gyros utilizing a fluid rotor within a rotating container and rate gyros utilizing a fluid rotor within a non-rotating container.

The prior art fluid rotor gyro designs previously mentioned are inherently rate (angular velocity) sensors. This is so because the means causing the fluid rotor to rotate about a spin axis necessarily exerts a force on the fluid rotor when the spin axis of the fluid is displaced from its original position. More specifically, in a spherical rotating container any angular displacement of the spin axis of the fluid body relative to the spin axis of the container results in a relative velocity therebetween. The shear forces due to the relative velocity produce a torque on the fluid rotor which precess it toward alignment with the spin axis of the container. This restraining force causes the instrument to function as a rate sensor. In a spherical, non-rotating containing, the fluid (such as mercury) is rotated by an external influence (such as an eddy current coupling with an external rotating magnetic field). Thus, when the spin axis of the fluid body is not coincident with the axis of symmetry of the motor field structure causing the rotation of the fluid, a force is exerted upon the fluid which ultimately aligns it with the axis of symmetry of the motor. Consequently, this restaining causes the instrument to function as a rate sensor.

The applicant overcomes these problems of the inherent restaining of a fluid rotor by providing a unique inlet nozzle. The inlet nozzle is effective to cause a fluid within a spherical chamber is a housing means to rotate about a spin axis. The inlet nozzle is also effective to maintain the alignment of the spin axis of the fluid substantially fixed in space when the housing is displaced relative thereto. The inlet nozzle which causes the fluid to rotate does not exert a restraining force on the fluid rotor upon displacement of the housing. Consequently, the applicant's invention may be utilized as a pure fluid position sensor.

The pure fluid position sensor is effectively a two axis displacement gyro. The advantages of a pure fluid position sensor utilizing a fluid rotor over the conventional two axis gyro utilizing a solid body rotor gimbaled about two axes are numerous. For example, a uniform body of homogeneous fluid in a container has its point of support (center of pressure) exactly at its center of gravity so it is inherently in accurate mass balance. A uniform body of homogeneous fluid is inherently isoelastic (a shift in the center of gravity due to an acceleration lies directly along the acceleration vector). The applicant's invention operates with fluids such as water or air which are non-magnetic so that the position sensor is not sensitive to external magnetic fields. The applicant's unique pure fluid sensor has no moving parts other than the rotating fluid so that there can be no mass shift of the rotor due to wear or shifting of parts which results in a vast increase in reliability. In addition, the applicant's pure fluid position sensor requires no gimbal for its suspension such as required by prior art displacement sensors. The applicant's pure fluid position sensor eliminates the necessity for electrical power and its associated flexible leads, slip rings, and other critical parts so as to provide increased accuracy at a much lower cost.

The applicant's invention is set forth in the accompanying specification and claims in conjunction with the drawings, in which:

FIGURE 5 is a cross sectional view of still another embodiment of an inlet nozzle; and FIGURE 6 is a cross sectional view of an alternate embodiment of a pure fluid position sensor.

Figure 1:
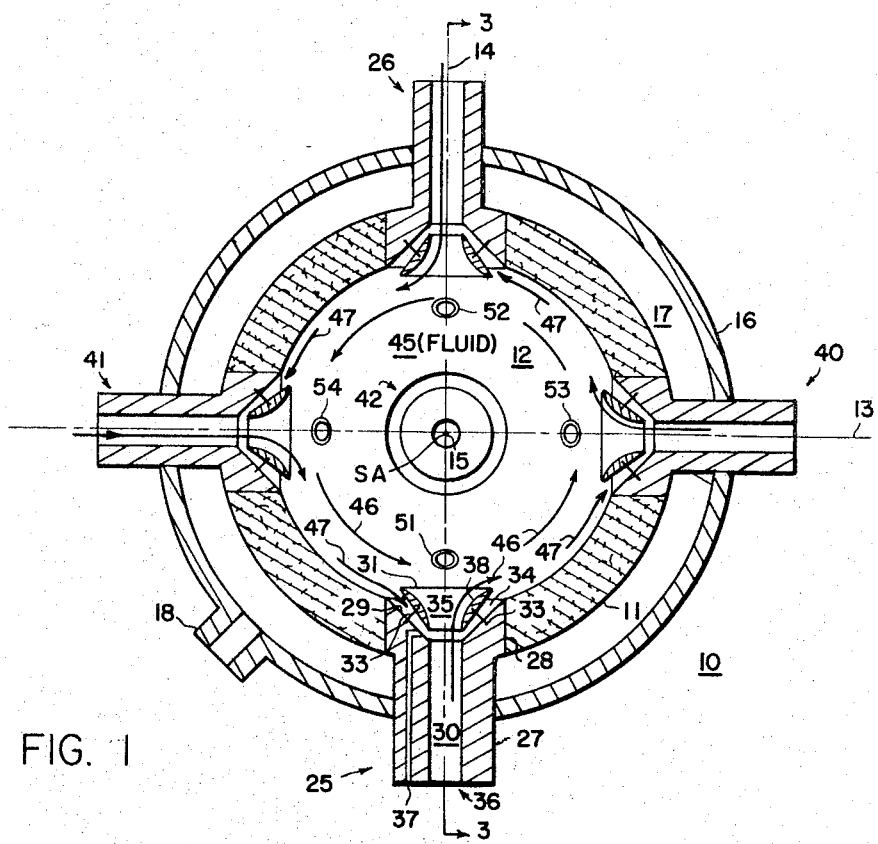
FIGURE 1 is a cross sectional view of a pure fluid position sensor.

Referring now to FIGURE 1, reference numeral 10 generally depicts the applicant's unique pure fluid position sensor. A generally spherical, porous housing means 11 is provided having a spherical chamber 12 therein. Housing means 11 may be fabricated from a sintered metal or other porous material. Housing means 11 is fixed with respect to three mutually orthogonal axes 13, 14 and 15, which intersect at the center of spherical chamber 12 and form a reference coordinate system. A hollow spherical manifold means 16 surrounds housing means 11. Manifold means 16 is spaced apart from housing means 11 so as to define a manifold chamber 17 therebetween. An exhaust port 18 is located within manifold means 16 and connects manifold chamber 17 to a suitable fluid exhaust (not shown).

A pair of inlet nozzles 25 and 26 are positioned in housing means 11 in opposed relationship. Inlet nozzles 25 and 26 are located along axis 14 on opposite sides of spherical chamber 12. Inlet nozzle 25 comprises a generally cylindrical hollow body member 27 having an enlarged diameter section 28 on one end thereof. Body member 27 has an opening therethrough symmetrical with respect to axis 14 including a divergent or conical opening portion 29 therein and a cylindrical opening portion 30. Cylindrical opening portion 30 extends through body member 27 along axis 14 and communicates with divergent opening portion 29 located within an enlarged diameter section 28 of body member 27. A hollow conical inlet member 31 is positioned within conical opening portion 29 and held in this position by means of a plurality of steel pins 33. Pins 33 hold conical insert member 31 spaced apart from body member 27 so as to form a generally annular feedback channel means 34 therebetween. Inlet member 31 has a divergent aperture 35 therethrough symmetrical with respect to axis 14. Aperture 35 is a segment of a paraboloid of revolution, diverging toward chamber 12. Thus, cylindrical opening portion 30 and divergent aperture 35 cooperate to form a fluid passage 36 trough inlet nozzle 25 along axis 14 and in communication with chamber 12. Feedback channel means 34 intersects passage 36 substantially at an angle to axis 14. A second fluid passage 37 is provided within body portion 27. One end of passage 37 is in communication with a fluid source (not shown) and the other end is in communication with feedback channel 34. Passage 37 is referred to as a starting jet and its function will be more fully discussed hereinafter.

Inlet nozzle 26 is identical to inlet nozzle 25 with the exception of starting jet 37. That is, inlet nozzle 26 does not have a starting jet.

Two other inlet nozzles 40 and 41 are positioned in housing means 11 in opposed relationship. Inlet nozzles 40 and 41 are located along axis 13 on opposite sides of chamber 12. Inlet nozzles 40 and 41 are identical to inlet nozzle 26 and need not be described in detail. Two additional inlet nozzles 42 and 43 are positioned in housing means 11 in opposed relationship (refer to FIGURE 3). Inlet nozzles 42 and 43 are located along axis 15 in opposite sides of chamber 12. Inlet nozzles 42 and 43 are identical to inlet nozzle 26.

It should be pointed out that the inlet nozzles need not be positioned in an orthogonal relationship as illustrated in FIGURE 1. In addition, more than six inlet nozzles or less than six inlet nozzles may be utilized. A single inlet nozzle such as inlet nozzle 25 may be utilized.

Figure 2:
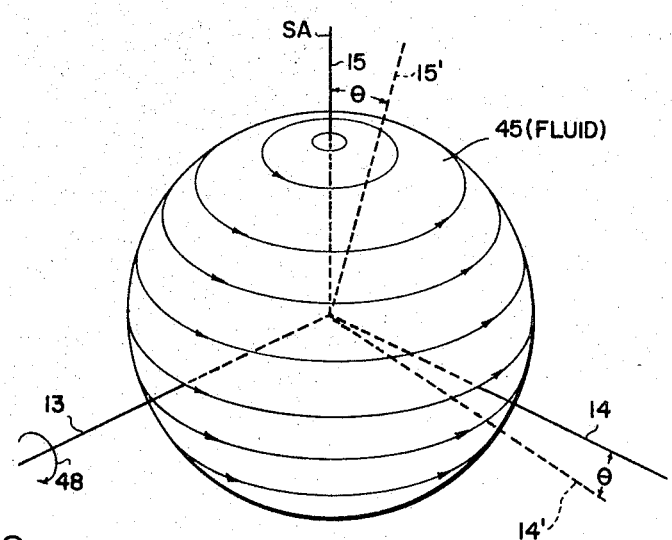
FIGURE 2 is a schematic representation of a pure fluid position sensor.

In operation, inlet nozles 25, 26, 40, 41, 42, and 43 are all connected to a common fluid source (not shown). The pressure of the fluid source is greater than the pressure within chamber 12 so that a fluid 45 is caused to flow through the inlet nozzles and into chamber 12. Passage or starting jet 37 is also connected to the fluid source when the inlet nozzles are connected to the fluid source. Fluid 45 flows from starting jet 37 into feedback channel 34 substantially perpendicular to axis 14. Fluid 45 which flows through starting jet 37 impinges upon fluid 45 flowing through passage 36 in inlet nozzle 25 along axis 14. The fluid flowing from starting jet 37 and the fluid flowing through passage 36 are subjected to a momentum interchange at the point of engagement. Vectorial analysis indicates that the resulting flow will be in a direction at an angle to axis 14 as indicated by arrow 46 in FIGURE 1. The resulting fluid flow "attaches" to a portion of the wall 38 defining aperture 35 in inlet member 31, according to the Coanda effect. More specifically, the resulting fluid flow exhausting from inlet nozzle 25 is symmetrical about a plane defined by axis 13 and 14. The flow of fluid is adjacent to a portion of the wall 38 of inlet member 31 defining aperture 35 lying within this plane. Wall portion 38 is more easily identified with reference to FIGURE 3, wherein it is shaded to to aid identification thereof. The flow of fluid adjacent wall portion 38 of inlet member 31 entrains fluid (such as air) existing therebetween and thereby functions to reduce the pressure existing therebetween. The ambient pressure existing in chamber 12 is higher than the pressure between the fluid exhausting from passage 36 and wall portion 38. Consequently, the pressure differential across the fluid exhausting from passage 36 acts to hold the fluid "attached" to wall portion 38. After fluid 45 attaches to wall portion 38 the fluid flowing through inlet nozzle 25 is caused to flow into chamber 12 so as to rotate about a spin axis SA as illustrated by arrows 46 in FIGURE 1. After fluid 45 attaches to wall portion 38 fluid flow through starter jet 37 is terminated and the fluid exhausting from inlet nozzle 25 continues to flow into chamber 12 and rotate about a spin axis SA. A portion of fluid 45 in chamber 12 flows into the feedback channel of inlet nozzles 26, 40, 41 as illustrated by arrows 47 in FIGURE 1. The fluid flowing into the feedback channels impinges upon the fluid flowing from the fluid source through inlet nozzles 26, 40, 41 so as to cause fluid 45 to flow into chamber 12 and rotate about a spin axis SA. Although the feedback channels are not perpendicular to the axis of symmetry of the inlet nozzles, the fluid flowing through the feedback channels has a component of flow perpendicular to the axis of symmetry. Consequently the fluid flowing through the inlet nozzle is caused to "attach" to a wall portion of the inlet nozzle and rotate about a spin axis, as explained with reference to inlet nozzle 25. The result of fluid 45 flowing through all of the inlet nozzles is a shell of fluid rotating about spin axis SA, such as schematically illustrated in FIGURE 2. Spin axis SA is coincident with axis 15 in FIGURE 1.

As fluid 45 rotates about spin axis SA there is frictional loss due to the relative movement between fluid 45 and housing means 11 which results in viscous shear of fluid 45. This frictional loss is minimized by exhausting a portion of fluid 45 through porous housing 11 so as to remove the boundary layer of fluid adjacent housing means 11. Fluid 45 flows through porous housing 11 into manifold chamber 17. Fluid 45 is removed from manifold chamber 17 through exhaust port 18.

FIGURE 2 discloses a schematic representation of fluid 45 rotating counter-clockwise about spin axis SA. The reference coordinate system composed of axes 13, 14 and 15, is superimposed upon the schematic representation of rotating fluid 45. The intersection of axes 13, 14 and 15 is located at the center of the rotating fluid. For purposes of illustration, assume that the reference coordinate system (housing means 11) is rotated about axis 13 through an angle $\theta$ in a clockwise direction as illustrated by arrow 48 in FIGURE 2. The new position of axis 15 is illustrated by the dotted line identified by reference numeral 15' in FIGURE 2. The new position of axis 14 is illustrated by the dotted line identified by reference numeral 14' in FIGURE 2. However, spin axis SA remains substantially fixed in space in its original alignment and the reference coordinate system (housing means 11) moves relative thereto. Thus, by measuring the angle between spin axis SA and the new position of the reference coordinate system, an indication of the position of the reference coordinate system relative thereto is obtained. Thus, by mounting housing means 11 (which is fixed with respect to the reference coordinate system) upon a vehicle, the position of the vehicle relative to a space reference is obtained.

The inlet nozzles function to maintain spin axis SA of fluid 45 fixed in space. This function can be described with reference to inlet nozzle 25. In the absence of an input, axis 15 is coincident with spin axis SA as illustrated in FIGURE 1. Fluid 45 flowing through passage 36 is caused to flow about spin axis SA, as previously explained, substantially in the plane defined by axes 13 and 14. Fluid exhausting from inlet nozzle 25 is attached to wall portion 38 of inlet member 31. Wall portion 38 is shaded in FIGURE 3 for purposes of illustration. When the reference coordinate system (housing means 11) is rotated about axis 13 through an angle $\theta$, inlet nozzle 25 will be displaced to a new position illustrated by phantom lines in FIGURE 3. However, the fluid exhausting from inlet nozzle 25 is caused to flow in a plane perpendicular to spin axis SA (parallel to the plane of the fluid flow). This result is primarily due to the interaction between the fluid flowing through from inlet nozzle 25 and a portion of the fluid rotating about spin axis SA within chamber 12. More specifically, a portion of the fluid rotating in chamber 12 flows through feedback channel means 34 after angular displacement $\theta$ in a plane perpendicular to spin axis SA. This fluid flowing through feedback channel means 34, impinges upon the fluid flowing through passage 36 at a different angle than before displacement. That is, after angular displacement $\theta$ of housing means 11 and inlet nozzle 25, the longitudinal axis of inlet nozzle 25 intersects the plane of the rotating fluid at an angle $\theta$. Consequently, the fluid flowing through passage 36 in inlet nozzle 25 is flowing at an angle $\theta$ to the plane of the rotating fluid. However, the fluid flowing through feedback channel means 34 impinges upon the fluid flowing through passage 36 at an angle such that the interchange therebetween results in a combined fluid flow exhausting from inlet nozzle 25 in a plane perpendicular to spin axis SA. Because of the new position of inlet nozzle 25 the fluid exhausting therefrom is caused to be attached to a different wall portion 38' of inlet member 31 (see FIGURE 3). The fluid flowing through inlet nozzle 25 in its new position continues to add momentum to the rotating fluid in the plane perpendicular to spin axis SA. This is significant because the means rotating the fluid about spin axis SA (inlet nozzles) do not exert a restraining force upon the rotating fluid. Consequently, spin axis SA of fluid 45 is maintained substantially fixed in space. By sensing the displacement of the reference coordinate system relative to spin axis SA, position information is obtained.

Figure 3:
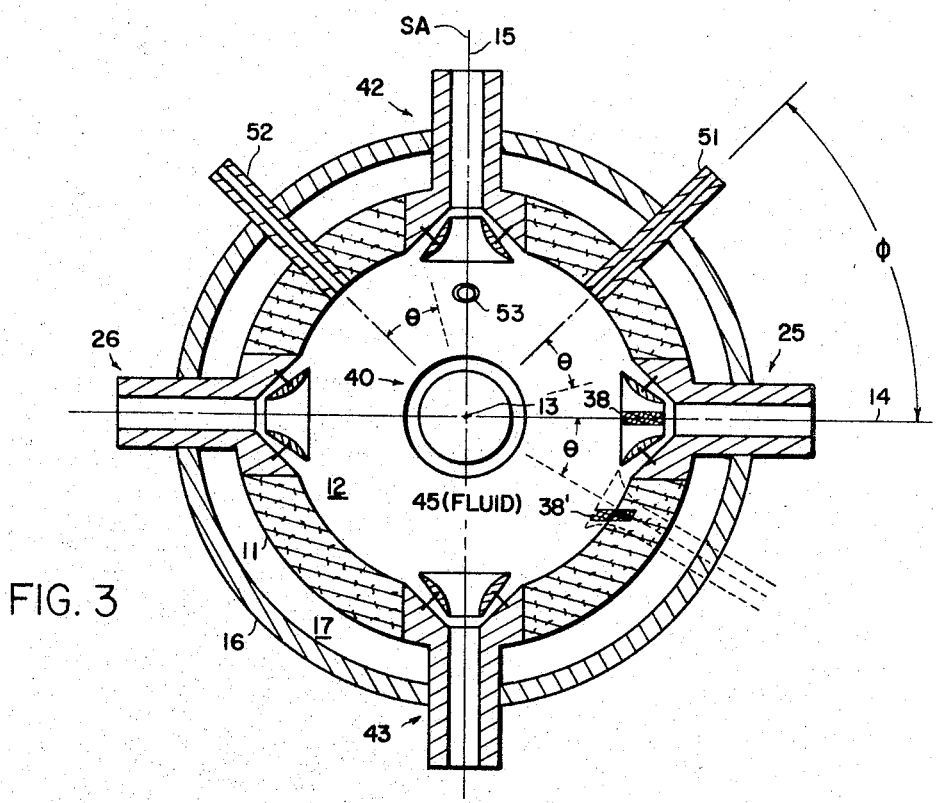
FIGURE 3 is a cross sectional view taken along section lines 3—3 of FIGURE 1.

One means of sensing the relative displacement between spin axis SA and the reference coordinate system is disclosed in FIGURE 3 and includes two static pressure ports 51 and 52. Static pressure ports 51 and 52 are connected to a suitable differential pressure sensor (not shown). Pressure ports 51 and 52 sense the pressure created by centrifical forces in the rotating fluid. The location of pressure ports 51 and 52 is not critical and may be varied depending on the shape of the differential pressure output curve desired. In the embodiment illustrated in FIGURES 1 and 3, pressure ports 51 and 52 are located in a plane defined by axes 14 and 15 and positioned at a 45 degree angle with respect to axis 14 and axis 15. Pressure ports 51 and 52 function to provide an output signal indicative of the angular displacement of the reference coordinate system about axis 13 relative to spin axis SA. Another pair of pressure ports 53 and 54 are provided for sensing the angular displacement of the reference coordinate system about axis 14 relative to spin axis SA. Pressure ports 53 and 54 are located in a plane defined by axes 13 and 15 and positioned at a 45 degree angle with respect to axes 14 and 15.

The centrifical pressure on the surface of a rotating spherical fluid body is given by the following formula:

$$P = \tfrac{1}{2}\rho\omega^2 R^2 \cos^2 \phi$$

where P is the pressure, $\rho$ is the fluid density, $\omega$ is the spin rate (angular velocity) and R is the radius, and $\phi$ is the latitude angle of the pressure ports. Thus, a change in radial distance of a pressure port from the spin axis SA changes the pressure sensed by the pressure port. When axis 15 is coincident with spin axis SA, pressure ports 51 and 52 sense equal pressures because the radial distance to spin axis SA from pressure ports 51 and 52 is the same. Rotating the reference coordinate system (housing means 11) clockwise about axis 13 through an angle $\theta$ results in pressure port 52 moving closer to spin axis SA. The new position of pressure port 52 is illustrated in phantom lines in FIGURE 3. Rotation of the reference coordinate system about axis 13 through an angle $\theta$ results in pressure port 51 moving further away from spin axis SA as illustrated in FIGURE 3. The resulting pressure differential between pressure ports 51 and 52 is given by $$\Delta P = \rho \omega^2 R^2 \cos^2 (\phi - \theta)$$

Thus the pressure differential sensed between pressure ports 51 and 52 is indicative of the position of the reference coordinate system relative to the spin axis SA.

The applicant does not wish to be limited to the static pressure ports disclosed in FIGURES 1 and 3 as means for sensing the position of spin axis SA relative to the reference coordinate system. For example, one pressure port may be utilized to sense the position of spin axis SA. In addition, other types of position sensing means may be utilized, for example, an air foil pickoff means such as disclosed in copending application Ser. No. 157,142, filed Dec. 5, 1961, Rudolf Hermann, and assigned to the same assignee as the applicant's invention.

Figure 4:
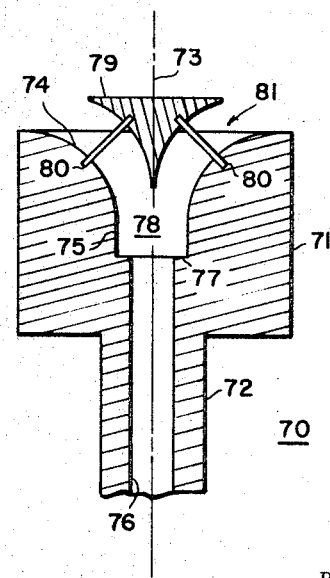
FIGURE 4 is a cross sectional view of an alternate embodiment of an inlet nozzle.

FIGURE 4 discloses an alternate embodiment of an inlet nozzle identified by reference numeral 70. Inlet nozzle 70 comprises a hollow cylindrical body member 71 having an opening therethrough symmetrical with respect to an axis 73. Body portion 71 has a decreased radius portion 72 on one end thereof. The other end of body member 71 has a divergent opening portion 74 therein which is a segment of a paraboloid of revolution. Opening portion 74 extends into body 71 a short axial extent. The smaller end of divergent opening portion 74 merges into one end of a cylindrical opening portion 75 within body member 71. The other end of cylindrical opening portion 75 is in communication with one end of a smaller diameter cylindrical opening portion 76 in body member 71. A difference in radius between opening 75 and opening 76 forms a shoulder 77 which is generally referred to as a setback. Divergent opening portion 74, cylindrical opening portion 75 and cylindrical opening portion 76 provide an opening 78 along axis 73 through inlet nozzle 70. A plug element 79 having the shape of a segment of a paraboloid revolution is provided. Plug 79 is positioned within divergent opening portion 74, symmetrical with respect to axis 73 and spaced apart from body portion 71. Plug 79 is held in this position by a plurality of pins 80. The space between plug 79 and body portion 71 provides a generally annular feedback channel means 81.

In operation, a fluid stream directed through passage 76 from a suitable fluid source (not shown) into bore 75 and opening 74 and exhausts through the space between plug 79 and body 71. The fluid stream is approximately the diameter of passage 76 and "attaches" to a portion of the wall of opening 74 according to the Coanda effect, previously explained with reference to FIGURES 1 and 3. Setback 77 functions to aid the attachment of the fluid to the wall of opening 74. It should be noted that the Coanda effect can be realized without setback 77. The applicant does not wish to be limited to a setback inlet nozzle design illustrated in FIGURE 4.

FIGURE 5 discloses still another embodiment of an inlet nozzle identified by reference numeral 60. Inlet nozzle 60 comprises a hollow cylindrical body member 61 having an opening therethrough symmetrical with respect to an axis 62. Body portion 61 has a decreased radius section 63 at one end thereof. The opposite end of cylindrical body member 61 has a divergent or conical opening portion 64 therein. A cylindrical opening portion 65 extends through body member 61 along axis 62, and is in communication with divergent opening portion 64. A hollow conical inlet member 66 is positioned within conical opening 64 with its axis of symmetry coinciding with axis 62. A plurality of planar baffle plates 67 are positioned intermediate conical inlet member 66 and body member 61 so as to define feedback channel means therebetween comprising a plurality of feedback channels 68. Each feedback channel 68 is formed between body member 61, conical inlet means member 66, and two baffle plates 67. The plurality of feedback channels 68 are symmetrically positioned about axis 62. Baffle plates 67 also function to hold conical inlet member 66 fixed with respect to body member 61. Conical inlet member 66 has a divergent aperture 69 therethrough which is a segment of a paraboloid of revolution and symmetrical with respect to axis 62. Thus, aperture 69 and the opening through body member 71 provides a fluid passage through inlet nozzle 60. Feedback channels 68 communicate with the fluid passage in a direction perpendicular thereto. Inlet nozzle 60 operates in a manner analogous to inlet nozzle 25 previously explained with reference of FIGURE 1.

Referring now to FIGURE 6, an alternate embodiment of a pure fluid position sensor is identified by reference numeral 85. Pure fluid position sensor 85 comprises a nonporous housing means 86 having a spherical chamber 87 therein. Housing means 86 is fixed with respect to a reference coordinate system defined by three mutually orthogonal axes 88, 89 and 90. A pair of inlet nozzles 91 and 101 are positioned in housing means 86 in opposed relationship. Inlet nozzles 91 and 101 are located along axis 88 and on opposite sides of spherical chamber 87.

Inlet nozzle 91 comprises a hollow cylindrical body member 92 having an opening therethrough symmetrical with respect to axis 88. One end of body member 92 has a divergent opening portion 93 therein which extends a short axial extent. Opening 93 is a segment of a paraboloid of revolution and is in communication with chamber 87. The other end of body portion 92 has a larger diameter cylindrical opening portion 94 therein. A reduced diameter cylindrical opening portion 95 connects bore 94 and opening 93. Opening portions 94, 95 and 93 thus provide a fluid passage 96 along axis 88 through inlet nozzle 91. A starter passage 97 is provided which is in communication with passage 96 perpendicular to axis 88. In operation, fluid flowing through starter jet 97 impinges on fluid flowing through passage 96 so as to direct the fluid to flow along the path illustrated by arrow 98 in FIGURE 6. Inlet nozzle 101 is identical to inlet nozzle 91 with the exception of starter jet 97.

Two inlet nozzles 99 and 100 are positioned in housing means 86 in opposed relationship. Inlet nozzles 99 and 100 are located along axis 89 and on opposite sides of chamber 87. Inlet nozzles 99 and 100 are identical to inlet nozzle 101. It should be noted that no feedback path is provided in inlet nozzles 91, 99, 100 and 101. The starting jet 97 and the resulting flow of fluid within chamber 87 is effective to bias the fluid flow through the inlet nozzles so as to sustain the rotation of the fluid about axis 90. In operation, fluid is supplied to chamber 87 through each of inlet nozzles 91, 99, 100 and 101 so as to provide a rotating shell of fluid.

Fluid is removed from chamber 87 through an exhaust passage 105 which is positioned within housing means 86. Exhaust passage 105 is an elongated tubular structure which extends through the housing means 86 to the center of chamber 87. A portion of the fluid in chamber 87 flows along a vortical flow pattern from the periphery of chamber 87 to the center thereof and is removed through exhaust passage 105.

A pair of static pressure ports 106 and 107 are positioned within housing means 86 and lie in the plane defined by axes 88 and 90. Pressure ports 106 and 107 are positioned at a 45 degree angle to axis 88 and axis 90. Another pair of pressure ports 108 and 109 are positioned within housing means 86. Pressure ports 108 and 109 lie in a plane defined by axis 89 and 90 and are positioned at 45 degrees with respect thereto. Pressure ports 106, 107, 108 and 109 are identical to pressure ports described with reference to FIGURE 3 and need not be discussed in detail. The inlet nozzles are effective to cause the fluid within chamber 87 to rotate about a spin axis SA. The inlet nozzles are also effective to maintain spin axis SA substantially fixed in space, as previously explained with reference to FIGURES 1–3. In operation, senor 85 provides an output signal indicative of the position the reference coordinate system relative to spin axis SA. The detailed operation of sensor 85 is analogous to sensor 10, explained previously, and no further description is deemed necessary.

While I have shown and described specific embodiments of this invenion, further modification and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A pure fluid position sensor comprising: housing means having a spherical chamber therein; three pairs of inlet nozzles within said housing means and in communication with said chamber, one pair of said three pairs of inlet nozzles being positioned upon each of three orthogonal axes intersecting at the center of said chamber, said three orthogonal axes defining a reference coordinate system; exhaust means in communication with said chamber; means for providing a continuous flow of fluid to said chamber through said inlet nozzles; means for initiating rotation of said fluid in said chamber about a spin axis aligned with said coordinate system, said inlet nozzles being effective to sustain said rotation and to maintain the alignment of said spin axis substantially fixed in space when said reference coordinate system is displaced relative thereto, said exhaust means being effective to remove a portion of said fluid from said chamber; and means for sensing the position of said spin axis relative to said reference coordinate system.

2. In a pure fluid position sensor in combination: housing means having a spherical chamber therein; three inlet nozzles within said housing means and in communication with said chamber, one of said inlet nozzles being positioned upon each of three orthogonal axes intersecting at the center of said chamber, said three orthogonal axes defining a reference coordinate system; exhaust means in communication within said chamber; means for providing a continuous flow of fluid to said chamber through said inlet nozzles; means for initiating rotation of said fluid in said chamber about a spin axis aligned with said coordinate system, said inlet nozzles being effective to sustain said rotation and maintain the alignment of said spin axis substantially fixed in space when said reference coordinate system is displaced relative thereto, and said exhaust means being effective to remove a portion of said fluid from said chamber; and means for sensing the position of said spin axis relative to said reference coordinate system.

3. In a fluid position sensor, in combination: porous housing means having a spherical chamber therein; a plurality of inlet nozzles within said housing means and in communication with said chamber, at least one of said inlet nozzles being positioned upon each of three orthogonal axes intersecting at the center of said chamber, said three orthogonal axes defining a reference coordinate system; means for providing a flow of fluid to said chamber through said inlet nozzles, means for initiating rotation of said fluid in said chamber about a spin axis aligned with said coordinate system said inlet nozzles being effective to sustain said rotation and maintain the alignment of said spin axis substantially fixed in space when said reference coordinate system is displaced relative thereto.

4. In a fluid position sensor in combination: porous housing means oriented with respect to a reference coordinate system, said housing means having a spherical chamber therein; a plurality of inlet nozzles within said housing means and in communication with said chamber; means for providing a flow of fluid to said chamber through said inlet nozzles; means for initiating rotation of said fluid about a spin axis aligned with said coordinate system, said inlet nozzles being effective to sustain said rotation and maintain the alignment of said spin axis substantially fixed in space when said reference coordinate system is displaced relative thereto, and means for sensing the position of said spin axis relative to said reference coordinate system.

5. In a fluid position sensor in combination: porous housing means fixed with respect to a reference coordinate system, said housing means having a spherical chamber therein; an inlet nozzle within said housing means in communication wth said chamber; means for providing a flow of fluid to said chamber through said inlet nozzle; means for initiating rotation of said fluid in said chamber about a spin axis aligned with said coordinate system, said inlet nozzle being effective to maintain the alignment of said spin axis substantially fixed in space when said reference coordinate system is displaced relative thereto; and means for sensing the position of said spin axis relative to said reference coordinate system.

6. In apparatus comprising: a body member, said body member having an opening therethrough symmetrical with respect to an axis, said opening including a cylindrical portion and a divergent portion; an inlet member; means positioning said inlet member within said divergent portion of said opening symmetrical with respect to said axis, said inlet member having a divergent aperture therethrough symmetrical with respect to said axis, said opening and said aperture cooperating to form a fluid passage along said axis, and said inlet member being spaced apart from said body member; a plurality of baffles angularly spaced about said axis and positioned intermediate said body member and said inlet member; said body member, said inlet member, and said baffles cooperating to form feedback channel means therebetween, and said feedback channel means intersecting with said fluid passage at an angle to said axis; and means for supplying a fluid to said feedback channel means.

7. In combination: a body member for supplying a fluid, said body member having an opening therethrough symmetrical with respect to an axis, said opening including a cylindrical portion and a divergent portion; an inlet member; means positioning said inlet member within said divergent portion of said opening symmetrical with respect to said axis, said inlet member having a divergent aperture therethrough symmetrical with respect to said axis; said opening and said aperture cooperating to form a fluid passage along said axis, said inlet member being spaced apart from said body member so as to form feedback channel means therebetween, said feedback channel means intersecting with said fluid passage at an angle to said axis and housing means for directing a feedback fluid into said feedback channel.

8. In combination: a body member for supplying a fluid, said body member having an opening therethrough symmetrical with respect to an axis, said opening including a cylindrical portion and a divergent portion; a plug member; means positioning said plug member within said divergent portion of said opening symmetrical with respect to said axis, said plug member being spaced apart from said body member so as to form feedback channel means therebetween, said feedback channel means intersecting within said opening at an angle to said axis and housing means for directing a feedback fluid into said feedback channel.

9. In combination:
a body member for supplying a fluid, having an opening therethrough symmetrical with respect to an axis, including a cylindrical inlet and a diverging outlet;
an inlet member; and
means positioning said inlet member axially within said diverging outlet of said opening and spaced from said body member so as to form feedback channel means therebetween and housing means for supplying a feedback fluid into said feedback channel.

10. In a fluid position sensor, in combination:
housing means fixed with respect to a reference coordinate system, said housing means having a spherical chamber therein;
an inlet nozzle within said housing means in communication with said chamber;
means for providing a flow of fluid to said chamber through said inlet nozzle;
means for initiating rotation of said fluid in said chamber about a spin axis aligned with said coordinate system, said inlet nozzle being effective to maintain the alignment of said axis substantially fixed in space when said reference coordinate system is displaced relative thereto; and
means for sensing the position of said spin axis relative to said reference coordinate system.

11. In a fluid position sensor, in combination:
housing means oriented with respect to a reference coordinate system, said housing means having a spherical chamber therein;
a plurality of inlet nozzles within said housing means and in communication with said chamber;
means for providing a flow of fluid to said chamber through said inlet nozzles;
means for exhausting fluid from said chamber without significantly altering the flow pattern of fluid in said chamber;
means for initiating rotation of said fluid about a spin axis aligned with said coordinate system, said inlet nozzles being effective to sustain said rotation and maintain alignment of said spin axis substantially fixed in space when said reference coordinate system is displaced relative thereto; and
means for sensing the position of said spin axis relative to said reference coordinate system.

12. Apparatus according to claim 1, in which an inlet nozzle comprises a body member having an opening therethrough symmetrical with respect to an axis and including a cylindrical portion and a divergent portion, inlet member, having a divergent aperture therethrough, and means positioning said inlet member symmetrically with respect to said divergent portion of said opening, so that said opening and said aperture cooperate to form a fluid passage along said axis.

13. Apparatus according to claim 1 in which an inlet nozzle comprises a body member having an opening therethrough symmetrical with respect to an axis and including a cylindrical portion and a divergent portion, a plug member, and means positioning said plug member symmetrically within said divergent portion of said opening and spaced from said body member so as to form feedback channel means therebetween.

14. A pure fluid position sensor comprising:
housing means having a spherical chamber therein;
three pairs of inlet nozzles within said housing means and in communication with said chamber, one of said three pairs of inlet nozzles being positioned upon each of three orthogonal axes intersecting at the center of said chamber, said three orthogonal axes defining a reference coordinate system;
exhaust means in communication with said chamber;
means for providing a continuous flow of fluid to said chamber through said inlet nozzles;
means including at least one of said inlet nozzles for initiating rotation of said fluid in said chamber about a spin axis aligned with said coordinate system, said inlet nozzles being effective to sustain said rotation and to maintain the alignment of said spin axis substantially fixed in space when said reference coordinate system is displaced relative thereto, said exhaust means being effective to remove a portion of said fluid from said chamber; and
means for sensing the position of said spin axis relative to said reference coordinate system.

15. A pure fluid position sensor comprising:
housing means having a spherical chamber therein;
three pairs of inlet nozzles within said housing means in communication with said chamber, one pair of said three pairs of inlet nozzles being positioned upon each of three orthogonal axes intersecting at the center of said chamber, said three orthogonal axes defining a reference coordinate system;
exhaust means in communication within said chamber;
means for providing a continuous flow of fluid to said chamber through said inlet nozzles, at least one of said inlet nozzles including means for initiating rotation of said fluid in said chamber about a spin axis aligned with said coordinate systems, said inlet nozzles being effective to sustain said rotation and maintain the alignment of said spin axis substantially fixed in space when said reference coordinate system is displaced relative thereto, said exhaust means being effective to remove a portion of said fluid from said chamber; and means for sensing the position of said spin axis relative to said reference coordinate system.

References Cited

UNITED STATES PATENTS

| 2,052,869 | 9/1936 | Coanda | 230—122 |
| 2,108,652 | 2/1938 | Coanda | 230—122 |
| 3,047,208 | 7/1962 | Coanda | 230—95 |
| 3,130,544 | 4/1964 | Penza | 60—35.54 |
| 3,200,653 | 8/1965 | Wing | 74—5 |

FRED C. MATTERN, Jr., *Primary Examiner.*

BROUGHTON G. DURHAM, *Examiner.*

J. D. PUFFER, *Assistant Examiner.*